US012664092B2

(12) United States Patent
Im

(10) Patent No.: US 12,664,092 B2
(45) Date of Patent: Jun. 23, 2026

(54) METHOD AND SYSTEM FOR MANAGING CACHE DATA BASED ON SCORE

(71) Applicant: SAMSUNG SDS CO., LTD., Seoul (KR)

(72) Inventor: Jong In Im, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 37 days.

(21) Appl. No.: 18/830,242

(22) Filed: Sep. 10, 2024

(65) Prior Publication Data

US 2025/0103495 A1 Mar. 27, 2025

(30) Foreign Application Priority Data

Sep. 22, 2023 (KR) ........................ 10-2023-0127182

(51) Int. Cl.
*G06F 12/0813* (2016.01)
*G06F 12/122* (2016.01)
*G06F 12/128* (2016.01)

(52) U.S. Cl.
CPC ........ *G06F 12/0813* (2013.01); *G06F 12/122* (2013.01); *G06F 12/128* (2013.01); *G06F 2212/601* (2013.01)

(58) Field of Classification Search
CPC .. G06F 12/0813; G06F 12/122; G06F 12/128; G06F 2212/601; G06F 16/9574; G06F 3/0614; G06F 3/0604; G06F 3/061; G06F 12/0802; G06F 2212/1016; G06F 2212/1032; G06F 2212/6024; H04L 67/568
See application file for complete search history.

(56) References Cited

U.S. PATENT DOCUMENTS 5,822,759 A * 10/1998 Treynor ................ G06F 12/122
                                                711/134
7,890,314 B2 2/2011 Cressman
9,996,476 B2 6/2018 Ash et al.
10,120,872 B2 11/2018 Choubey et al.
(Continued)

FOREIGN PATENT DOCUMENTS

CN 107147696 B 11/2019
CN 113326214 A 8/2021
CN 110740148 B 3/2022
(Continued)

OTHER PUBLICATIONS

Communication issued Jan. 20, 2025 by the European Intellectual Property Office in counterpart European Patent Application No. 24198851.8.
(Continued)

*Primary Examiner* — Hosain T Alam
*Assistant Examiner* — Alan Otto
(74) *Attorney, Agent, or Firm* — Sughrue Mion, PLLC

(57) ABSTRACT

A system for managing cache data based on a score is provided. The system includes at least one processor that implements: a score management module configured to receive an inquiry request for data from a client terminal and obtain a score of the data by using inquiry frequency information of the data for each time period; and a data management module configured to store the data in a local cache of a service server or a cache server based on the score.

17 Claims, 10 Drawing Sheets

(56) References Cited

U.S. PATENT DOCUMENTS

| | | | |
|---|---|---|---|
| 2013/0013726 A1 | 1/2013 | Westberg et al. | |
| 2013/0018978 A1* | 1/2013 | Crowe ................ | H04L 67/2885 |
| | | | 709/214 |

FOREIGN PATENT DOCUMENTS

| | | |
|---|---|---|
| CN | 116185897 A | 5/2023 |
| CN | 116185904 A | 5/2023 |

OTHER PUBLICATIONS

Vytenis Kaubrė, "Python Cache: How to Speed Up Your Code with Effective Caching", May 17, 2023, 18 pages, url: https://oxylabs.io/blog/python-cache-how-to-use-effectively, XP093292129.
Communication issued on Jul. 9, 2025 by the European Patent Office in counterpart European Patent Application No. 24198851.8.

* cited by examiner

| time | 16:02 | 16:03 | 16:06 | 16:09 | 16:11 | 16:14 | 16:15 | 16:18 | 16:20 |
|---|---|---|---|---|---|---|---|---|---|
| inquiry counts | 3 | 5 | 2 | 4 | 7 | 10 | 8 | 6 | 2 |

2a

| reference time | 16:12 | 16:13 | 16:14 | 16:15 | 16:16 | 16:17 | 16:18 | 16:19 | 16:20 |
|---|---|---|---|---|---|---|---|---|---|
| inquiry sum | 21 | 18 | 23 | 31 | 31 | 29 | 35 | 35 | 33 |

2b

3a

| factor | Data 1 | Data 2 | Data 3 | Data 4 | Data 5 | Data 6 |
|---|---|---|---|---|---|---|
| size of data | 100 | 10 | 40 | 50 | 30 | 20 |
| inquiry frequency information for each time period (inquiry sum) | 30 | 20 | 20 | 15 | 20 | 10 |
| basic score | 30 | 20 | 20 | 15 | 20 | 10 |
| adjustment score | 0.3 | 2 | 0.5 | 0.3 | 0.66 | 0.5 |
| distance between data storage in which data is stored and service server | 1 | 0.2 | 0.5 | 0.8 | 0.3 | 1 |
| group of data (whether data is first group) | 0 | 1 | 0 | 1 | 0 | 0 |

3b

| factor | Data 1 | Data 2 | Data 3 | Data 4 | Data 5 | Data 6 |
|---|---|---|---|---|---|---|
| size of data | 100 | 10 | 40 | 50 | 30 | 20 |
| inquiry frequency information for each time period (inquiry sum) | 30 | 20 | 20 | 15 | 20 | 10 |
| distance between data storage in which data is stored and service server | 1 | 0.2 | 0.5 | 0.8 | 0.3 | 1 |
| group of data (whether data is first group) | 0 | 1 | 0 | 1 | 0 | 0 |

FIG. 3

METHOD AND SYSTEM FOR MANAGING CACHE DATA BASED ON SCORE

CROSS-REFERENCE TO RELATED APPLICATION

This application claims priority from Korean Patent Application No. 10-2023-0127182 filed on Sep. 22, 2023, in the Korean Intellectual Property Office and all the benefits accruing therefrom under 35 U.S.C. 119, the contents of which in its entirety are herein incorporated by reference.

BACKGROUND

1. Technical Field

The present disclosure relates to a method and system for managing cache data based on a score, and more particularly to, a method for storing and managing cache data in an appropriate location based on a score calculated in accordance with a specific criterion and a system to which the method is applied.

2. Description of the Related Art

Currently, many online services are not only provided in Korea or on one continent but also provided all over the world. Providers of these global services are trying to efficiently provide data in various ways such as adding physical servers to provide stable services to users around the world. In this case, a physical server accessed by users may be different depending on physical locations where the users use services, and a distance from a physical location where data is stored may widen to the level of an intercontinental distance depending on circumstances. In addition, there may be many inquiry requests instantaneously depending on features of data such as a service situation or an entire public notice.

In this case, although many current global services mainly use separate cache servers to handle a large amount of traffic, this requires a lot of network costs for allowing a system to access the cache server. In addition, since excessive access to the cache server may generate a lot of traffic and increase the load on the system, it may threaten stability of the entire service. In addition, as the server's own local cache that does not require a separate network cost is not used, it may cause loss in performance in providing and managing data.

In this regard, technologies capable of lowering the cost of accessing cache data and improving overall performance of a system, such as access speed and system stability, while using a cache server and a local cache together, will be required.

SUMMARY

An object of the present disclosure is to provide a method and system capable of inquiring data by utilizing both a local cache of a server and a cache server.

Another object of the present disclosure is to provide a method and system for providing a score calculation criterion that may give priority to data predicted to be frequently inquired by a user.

Other object of the present disclosure is to provide a method and system capable of selecting data to be stored in a local cache by using a score calculated based on a plurality of reference elements.

The objects of the present disclosure are not limited to those mentioned above and additional objects of the present disclosure, which are not mentioned herein, will be clearly understood by those skilled in the art from the following description of the present disclosure.

According to an aspect of an example embodiment, there is provided a system for managing cache data based on a score, the system including at least one processor that implements: a score management module configured to receive an inquiry request for data from a client terminal and obtain a score of the data by using inquiry frequency information of the data for each time period; and a data management module configured to store the data in a local cache of a service server or a cache server based on the score.

The inquiry frequency information may include information obtained by summing inquiry frequencies of the data for each time period, the inquiry frequencies being obtained for a first period based on a time when the inquiry request is received.

The first period may have a value that increases based on the inquiry frequency information of the data for each time period having a value less than a reference value.

The score management module may be configured to obtain the score of the data by further considering a size of the data.

The score of the data may correspond to a value obtained by dividing a value of the inquiry frequency information of the data for each time period by the size of the data.

The score management module may be configured to obtain the score of the data by further considering a distance between a data storage in which the data is stored and the service server, and the data storage may be a location where the data is stored before a time of receiving the inquiry request.

The score management module may be configured to obtain the score, based on the inquiry frequency information of the data for each time period and the size of the data, and adjust the obtained score in accordance with the distance between the data storage and the service server.

The score management module may be configured to obtain the score of the data by further considering group information of the data.

The score of the data may be obtained by giving a high weight to the group information of the data based on the data belonging to a first group, and the first group may be a set of data of which estimated frequency of the inquiry request for data is greater than or equal to a reference value.

The data management module may be configured to store the data in the local cache of the service server based on the score of the data being greater than or equal to a reference value.

The data management module may include: a determination unit configured to determine whether the data is to be stored in the local cache of the service server, based on the score of the data; and a local cache management unit configured to replace specific data previously stored in the local cache with the data, based on the data being determined to be stored in the local cache and a resource usage of the local cache being greater than or equal to a first reference value, and the specific data may have a score lower than the score of the data.

The data management module may further include a cache server management unit, and the local cache management unit is configured to transmit the specific data to the cache server management unit, the cache server management unit may be configured to replace first data previously stored in the cache server with the specific data based on a resource usage of the cache server being greater than or equal to a second reference value, and the first data may have a score lower than the score of the specific data.

The data management module may further include a cache server management unit, and the determination unit is configured to transmit the data to the cache server management unit based on the data being determined not to be stored in the local cache, the cache server management unit may be configured to replace first data previously stored in the cache server with the data based on the resource usage of the cache server being greater than or equal to a third reference value, and the first data may have a score lower than the score of the data.

The service server may include a plurality of service servers, and the data management module may be configured to store the data in the local cache of each of the plurality of service servers.

The at least one processor may further implement a monitoring module configured to monitor a resource usage of the local cache of each of the plurality of service servers, the data management module may be configured to replace data previously stored in a local cache of a first service server, which has a resource usage of a reference value or more, with the data based on a monitoring result received from the monitoring module, and the previously stored data may have a score lower than the score of the data.

The at least one processor may further implement a monitoring module configured to monitor a resource usage of the local cache of each of the plurality of service servers, and the data management module may be configured to store the data in a local cache of a first service server, which has a resource usage of a reference value or less, based on a monitoring result received from the monitoring module.

According to an aspect of an example embodiment, there is provided a method for managing cache data based on a score, performed by using at least one processor, the method including: receiving an inquiry request for data from a client terminal; obtaining a score of the data by using inquiry frequency information of the data for each time period; and determining a storage location of the data as any one of a local cache of a service server and a cache server based on the score.

The inquiry frequency information may include information obtained by summing inquiry frequencies of the data for each time period, the inquiry frequencies being obtained for a first period based on a time when the inquiry request is received.

The obtaining the score of the data may include obtaining the score of the data by further considering at least one of a size of the data, a distance between a data storage in which the data is stored and the service server, or group information of the data, and the data storage may be a location where the data is stored before a time of receiving the inquiry request.

According to an aspect of an example embodiment, there is provided a method for managing cache data based on a score, performed by using at least one processor, the method including: requesting a local cache of a service server to inquire first data, in response to receiving an inquiry request for the first data from a user; requesting a cache server to inquire the first data, based on the first data being not inquired in the local cache of the service server; and requesting a data storage to inquire the first data based on the first data being not inquired in the cache server.

According to the embodiment of the present disclosure, a local cache of a service server and a cache server may construct a system to store and manage data, thereby saving a network cost consumed by storing and managing data in only the cache server, and avoiding a safety problem due to overload of the system or the cache server, which may occur due to excessive data inquiry.

According to the embodiment of the present disclosure, a score of data may be calculated using a result (i.e., inquiry frequency for each time period) of measuring inquiry counts based on timeline of a specific period (e.g. 10 minutes), so that optimal data to be stored in a local cache of a service server may be determined, and the possibility of cache hit may be increased.

According to the embodiment of the present disclosure, a score may be calculated more exactly by referring to a plurality of reference elements, and the possibility of cache hit and cache efficiency of the entire system may be improved.

According to the embodiment of the present disclosure, data may be stored and managed based on the resource usage of the local cache of the service server or the resource usage of the cache server, so that limited memory resources may be effectively utilized.

The effects according to the embodiment of the present disclosure are not limited to those mentioned above, and more various effects are included in the following description of the present disclosure.

BRIEF DESCRIPTION OF THE DRAWINGS

The above and other aspects and features of the present disclosure will become more apparent by describing in detail exemplary embodiments thereof with reference to the attached drawings, in which:

FIG. 3 is an exemplary view illustrating a method of calculating a score of data, which may be referenced in some embodiments of the present disclosure;

DETAILED DESCRIPTION

Figures 1, 2:
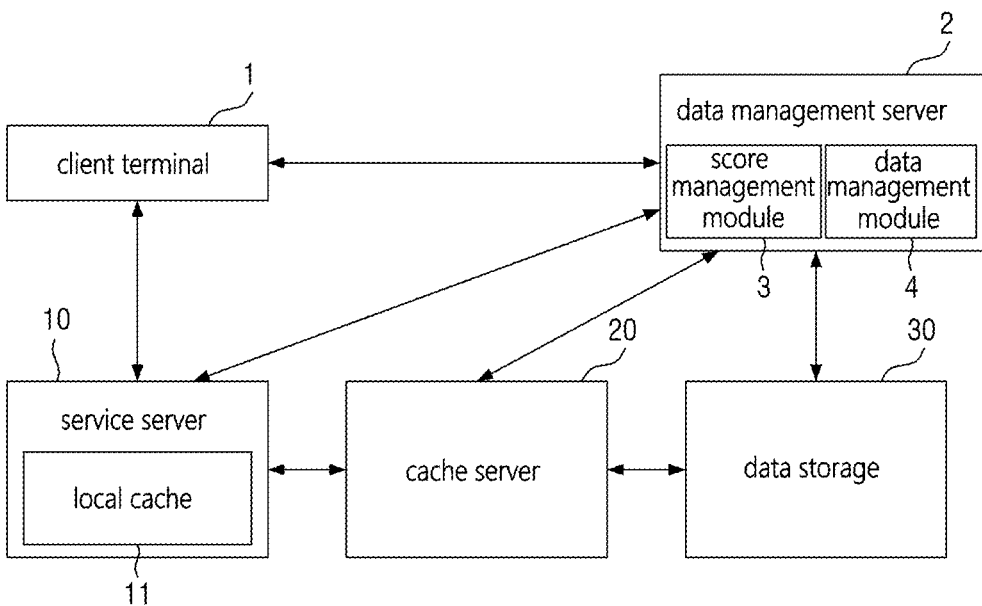
FIG. 1 illustrates an exemplary environment to which a system for managing cache data based on a score according to some embodiments of the present disclosure may be applied.
FIG. 2 is an exemplary view illustrating inquiry frequency information of data for each time period, which may be referenced in some embodiments of the present disclosure.

Hereinafter, example embodiments of the present disclosure will be described with reference to the attached drawings. Advantages and features of the present disclosure and methods of accomplishing the same may be understood more readily by reference to the following detailed description of example embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that may be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), may be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Embodiments of the present disclosure will be described with reference to the attached drawings.

FIG. 1 illustrates an exemplary environment to which a system for managing cache data based on a score according to some embodiments of the present disclosure may be applied.

As illustrated in FIG. 1, the system for managing cache data based on a score according to some embodiments of the present disclosure may include a client terminal 1, a data management server 2 that includes a score management module 3 and a data management module 4, a service server 10 that includes a local cache 11, a cache server 20, and a data storage 30.

In this case, the data management server 2 may calculate a score of data in accordance with a predefined score calculation criterion in response to an inquiry request of data received from a client terminal and determine a storage location of the data as any one of the local cache 11 of the service server 10, the cache server 20 and the data storage 30 based on the calculated score. In addition, the predefined score calculation criterion may be at least one of the inquiry frequency of data for each time period, a size of the data, a distance between a data storage in which data is stored and the service server or group information of the data.

In more detail, based on the score of the data, which is calculated by the data management server 2, data of an upper score may be stored in the local cache 11 of the service server 10, data of a middle score may be stored in the cache server 20, and data of a lower score may be stored in the data storage 30. The predefined score calculation criterion and operations performed by the data management server 2 will be described in detail later with reference to FIGS. 2 to 7.

Meanwhile, the service server 10 provided with the local cache 11, the cache server 20 and the data storage 30 may transmit and receive some of pre-stored data to and from one another when the current resource usage is insufficient, based on the respective resource usage. A detailed description related to this will be given later with reference to FIGS. 5 and 6.

In summary, the system may be constructed by the local cache of the service server and the local cache together, so that the cache data may be selectively stored and managed in accordance with the inquiry frequency (e.g., inquiry frequency for each time period) of data. Therefore, the network cost consumed by storing and managing data in the separate cache server may be reduced, and a safety problem due to overload of the system or the cache server, which may occur due to excessive data inquiry, may be avoided.

In addition, the score of the data may be calculated based on the predefined data calculation criterion, high-ranking data may be stored and managed in the local cache of the service server based on the priority according to the calculated score, middle-ranking data may be stored and managed in a separate cache server, and low-ranking data may be directly stored and managed in a data storage without using a cache. Therefore, the data may be stored and managed by being distributed in multiple data storages of different physical locations based on the score of the data, so that stability and cache performance of the system may be optimized.

Meanwhile, although FIG. 1 shows that there is one client terminal 1, one data management server 2, one service server 10, one cache server 20 and one data storage 30, this only assumes an exemplary situation in which each component of the system for managing cache data based on a score is one for convenience of understanding, and it should be noted that the present disclosure is not limited to this example.

The client terminal 1 may refer to a computing device used by a user to inquire data managed through the system for managing cache data based on a score. For example, the client terminal 1 may be implemented as various types of computing devices such as a smartphone, a desktop and a laptop, and may be implemented as any device. A detailed description of the process of inquiring data by the user through the client terminal 1 will be given later with reference to FIGS. 8 to 10.

The data management server 2 may refer to a computing device/system capable of effectively reducing the network cost and load of the system and maximizing usage efficiency of the local cache of the service server and the cache server.

In more detail, the data management server 2 may include a score management module that calculates a score of data based on the inquiry frequency of the data for each time period and a data management module that stores and manages the data in the local cache of the service server or the cache server based on the calculated score.

The data management server 2 may be implemented in at least one computing device. For example, all functions of the data management server 2 may be implemented in a single computing device, a first function of the data management server 2 may be implemented in a first computing device, and a second function thereof may be implemented in a second computing device. Alternatively, a specific function of the data management server 2 may be implemented in a plurality of computing devices. Likewise, the service server 10 and the cache server 20 may be also implemented in at least one computing device, their first function may be implemented in the first computing device, their second function may be implemented in the second computing device, and one specific function may be implemented in the plurality of computing devices.

The computing device may include any device having a computing function, and an example of such a device will be described with reference to FIG. 11. Since the computing device is an assembly in which various components (e.g., memory, processor, etc.) interact, it may be sometimes referred to as a 'computing system'. Also, the computing system may mean an assembly in which a plurality of computing devices interact. Furthermore, the computing device may be a server (including VM, Cloud, etc.), a desktop, a laptop, etc., but is not limited thereto, and may include any type of device having a computing function.

Meanwhile, although the data management server 2 is constructed in the form of a separate server in FIG. 1, this is only for convenience of understanding, and the data management server 2 is not limited to such an example. That is, the data management server 2 may be constructed in the service server 1.

An exemplary environment to which the system for managing cache data based on a score according to some embodiments of the present disclosure may be applied has been schematically described with reference to FIG. 1. Hereinafter, the system and method for managing cache data based on a score according to some embodiments of the present disclosure will be described in detail with reference to the drawings subsequent to FIG. 2. However, in order to provide more convenience of understanding, the description will be continued on the assumption that methods to be described later are performed in the environment illustrated in FIG. 1.

FIG. 2 is an exemplary view illustrating inquiry frequency information of data for each time period, which may be referenced in some embodiments of the present disclosure.

In general, in most cases, in the process of inquiring data by a user, there is a high possibility or probability that recently inquired data will be inquired again. In calculating the score of the data by using inquiry count information of the data, when the data that has been inquired a lot in the past is used at the time of summing inquiry counts, the score of the data that has been inquired a lot in the past may be calculated to be high and thus the data may be misunderstood as frequently inquired data. Therefore, a technology for selecting data that has many inquiries occurred at the past time but has less inquiries occurring at the current time is required.

The inquiry frequency of data for each time period, which may be referenced in some embodiments of the present disclosure, may mean a value calculated using inquiry counts according to a separate timeline for data, not a value calculated by simply summing inquiry counts of the data.

In more detail, the inquiry frequency of data for each time period may be information obtained by summing the inquiry frequency for each time period, which is measured for a first period based on the time when an inquiry request of the data is received. In this case, the first period may be a value arbitrarily set before the time when the inquiry request of the data is received.

For example, data inquiry frequency information for each time period may be generated by summing the inquiry frequency for each time period, which is measured for 10 minutes (e.g., from 11:50 to 12:00) based on the time (e.g., 12:00) when the inquiry request of the data is received from the client terminal.

Table 2a shown in FIG. 2 is a table illustrating inquiry counts of specific data requested by the user over time. As shown in Table 2a, when the score of the data is calculated using inquiry count information of specific data for a specific time, since the data may be data that is not actually frequently inquired even though the data is data of a high score, which is stored in the local cache of the service server, the local cache of the service server may not be effectively utilized.

Referring to Table 2b of FIG. 2, the sum (i.e., the sum from 16:02 to 16:12, 3+5+2+4+7=21) of data inquiry counts for previous 10 minutes based on a time point of 16:12 may be utilized in the process of calculating the score of the data. In this case, the time point of 16:12 may mean a time point at which the user requests data inquiry.

Therefore, the score of the data may be calculated using the result (i.e., the inquiry frequency for each time period) obtained by measuring inquiry counts based on the timeline for a specific period (e.g., 10 minutes), so that optimal data may be stored in the local cache of the service server and the possibility of cache hit may be increased.

In one embodiment, the first period may be a value that varies depending on circumstances. For example, the first period may be a value that is increased when the inquiry frequency of the data for each time period is less than a reference value. Also, the first period may be a value that is increased when a sum of differences in inquiry frequencies of data for each time period at a plurality of consecutive time points is less than a reference value.

Meanwhile, the method of setting the optimal value of the first period, which may vary depending on the above-described situation, follows the existing research method or commercialized optimization method. Since those skilled in the art may be already familiar with how to obtain the corresponding value, a detailed description of the method will be omitted.

In summary, the score of the specific data may be calculated based on the inquiry frequency information summed in accordance with the timeline (i.e., specific period) without calculating the score of the specific data based on simple inquiry count frequency information on the specific data, so that data that will be most frequently inquired at the time (i.e. current time) when the user requests data inquiry may be stored in the local cache of the service server. Therefore, the score of the data may be managed over time, so that even data having a high score at the past time but being not inquired within a certain period from the current time may be deleted from the local cache, whereby the possibility of cache hit may be effectively increased.

Hereinafter, a method of calculating a score of data by using a plurality of elements including inquiry information of data for each time period, which is illustrated in FIG. 2, will be described with reference to FIG. 3.

FIG. 3 is an exemplary view illustrating a method of calculating a score of data, which may be referenced in some embodiments of the present disclosure.

First, a method of calculating a score of data according to one embodiment of the present disclosure will be described with reference to Table 3a illustrated in FIG. 3.

Table 3a is a schematic diagram of a data list at a specific time, and is a table showing a score calculated based on a size of data, inquiry frequency information of data for each time period, a distance between a data storage in which data is stored and the service server and group information of the data. In this case, a basic score may mean a score calculated in consideration of only inquiry frequency information of data for each time period, and the adjustment score may mean a score calculated in consideration of inquiry frequency information of data for each time period and the size of data.

In addition, the distance between the data storage in which data is stored and the service server and the group information of the data are factors used to determine whether the data is a cache target. When the factors have a value of 0, the data may not be a cache target. When the factors have a value of 1, the data may be a cache target. However, the distance between the data storage in which data is stored and the service server and the group information of the data may be used to calculate the score of the data in various ways other than the above-described method, and the description related to this will be given with reference to Table 3b.

Referring back to Table 3a, before determining the priority of data to be stored in the local cache by calculating the score of the data, it is possible to determine whether the data is a cache target based on the distance between the data storage in which data is stored and the service server and the group information of the data. That is, since the distance value between the data storage in which data is stored and the service server is 0 and a group value of the data is 0, it may be determined that Data 3 and Data 5 are not cache targets. When it is determined that Data 3 and Data 5 are not cache targets, Data 3 and Data 5 may be stored in a general data storage.

In this case, ae distance value between the data storage in which data is stored and the service server may be determined based on a physical location, and when the distance between the data storage and the service server is less than or equal to a reference value, the distance value may have a value of 0. Furthermore, a group value of data may be determined based on whether a group to which data belongs, among a plurality of groups classified based on an estimated number of inquiry frequencies, is a first group, and when the data belongs to the first group having a high estimated number of inquiry frequencies, the group value may have a value of 0. Furthermore, data belonging to the first group may refer to data predictable to receive many inquiry requests from users, such as a notice or event information at a specific time point.

Next, in case of Data 1, Data 2, Data 4 and Data 6 excluding Data 3 and Data 5, a score may be calculated based on the size of the data and inquiry frequency information of the data for each time period. Meanwhile, the local cache of the service server in which data will be stored and the memory of the cache server are limited, and the data may be stored in the server with a less resource usage in consideration of the resource usage of the local cache of the service server and the cache server.

First, assuming that there is a resource margin of 100 in the local cache of the service server, a problem that may occur when considering only inquiry frequency information of data for each time period without considering the size of the data will be described.

When only inquiry frequency information of data for each time period is considered in the process of calculating the score of the data, scores of Data 1, Data 2, Data 4 and Data 6 may be calculated like basic score shown in Table 3a. Since there is a resource margin of 100 in the local cache, only Data 1 having the highest inquiry frequency (i.e. inquiry sum) of 30 for each time period may be stored in the local cache. In this case, an expected value of a cache hit of cache data among all possible inquiry requests may be calculated by an equation such as "Data 1/(Data 1+Data 2+Data 4+Data 6)". Therefore, the expected value of the cache hit may be "30/(30+20+15+10), 0.4".

On the other hand, when both the inquiry frequency information of data for each time period and the size of the data are considered in the process of calculating the score of the data, the scores of Data 1, Data 2, Data 4 and Data 6 may be calculated like the adjustment score of Table 3a. In this case, the adjustment score may be a value obtained by dividing the inquiry frequency of data for each time period by the size of the data. Also, based on the adjustment score, a data set capable of adding the most data within the range of the resource margin of 100 may be a data set consisting of Data 2, Data 4 and Data 6. In this case, among all possible inquiry requests, the expected value of the cache hit of the cache data may be calculated by an equation such as "(Data 2+Data 4+Data 6)/(Data 1+Data 2+Data 4+Data 6)", and the expected value of the cache hit may be "(2+0.3+0.5)/(0.3+2+0.3+0.5), 0.9".

Therefore, in the same resource situation of the local cache, since the expected value of the cache hit based on the basic score is 0.4 and the expected value of the cache hit based on the adjusted score is 0.9, the size of the data may be further considered in the process of calculating the score of the data, whereby the possibility of the cache hit may be more increased than the case that the score is calculated in consideration of only the inquiry frequency of data for each time period.

In summary, when the physical distance between the data storage in which data is stored and the service server is less than or equal to the reference value, since it hardly takes time to import the data from the server, it may be determined that the data is not cache target data. In addition, when the data is not expected that there are very frequent inquiry requests due to the features of the system, since it is not necessary to preferentially store and manage the data in the local cache, it may be determined that the data is not cache target data. Therefore, data that is not determined as cache target data may not be subjected to a subsequent process to save resources, and optimal data may be stored in the local cache or the cache server, whereby system bottleneck may be avoided in advance.

Furthermore, in the process of calculating the score of the data, the size of the data may be further considered in the inquiry frequency of the data for each time period depending on the resource state of the server, so that the possibility of cache hit and cache efficiency of the entire system may be improved.

Next, a method of calculating a score of data according to one embodiment of the present disclosure will be described with reference to Table 3b illustrated in FIG. 3.

In case of Table 3a, only whether or not the inquiry request data is cache target data is determined based on the distance between the data storage in which data is stored and the service server and the group information of the data, but the distance between the data storage in which data is stored and the service server and the group information of the data may be used in the process of calculating the score of the data together with the size of the data and the inquiry frequency information of the data for each time period. For example, a weight may be given to each of the distance between the data storage in which data is stored and the service server, the group information of the data, the size of the data and the inquiry frequency information of the data for each time period, so that the score of the data may be calculated.

In one embodiment, as the distance between the data storage in which data is stored and the service server is greater, a higher weight may be given so that the score of the data may be calculated. In this case, the data storage may be any one of the local cache of the service server, the cache server and the general data storage, in which data is stored before the time point at which the user inquires the data. That is, as the physical distance to the data storage in which data is stored is greater, the time and cost consumed to import the data may be increased. In order to avoid this, as the distance between the data storage in which data is stored and the service server is greater, the higher weight may be given.

For example, a weight of 1 may be given to Data 1 and Data 6, which have the greatest distance between the data storage in which data is stored and the service server, and a weight of 0.2 may be given to Data 2 having the smallest distance between the data storage in which data is stored and the service server.

Meanwhile, in the process of calculating the score by giving a weight to the distance between the data storage in which data is stored and the service server, the score may be calculated at once in consideration of a weight given to other score calculation reference elements (e.g., the size of the data and inquiry frequency for each time period). As described with reference to FIG. 3a, the adjustment score may be re-adjusted in consideration of the weight given to the distance between the data storage in which data is stored and the service server at the time after the adjustment core is calculated using the size of the data and the inquiry frequency of the data for each time period.

In one embodiment, in the process of calculating the score of the data, different weights may be given depending on groups to which the data belongs. A plurality of data may be grouped depending on an expected frequency of inquiry request, and data having an expected frequency of inquiry request greater than or equal to a reference value may be grouped into a first group. In this case, the data belonging to the first group may refer to data estimated to be frequently inquired at a specific time, such as a notice, a profile, an important mail, etc. That is, in case of data estimated to be frequently inquired, since it is advantageous to store and manage the data in the local cache in terms of time and cost, a high weight may be given to a group corresponding to data having a high estimated inquiry frequency.

For example, Data 2 and Data 4, which have a high estimated inquiry frequency of data, may be classified into a first group, and a weight of 1 may be given to Data 2 and Data 4. Also, Data 3 and Data 6, which have a low estimated inquiry frequency of data, may be classified into a third group, and a weight less than 1 may be given to Data 3 and Data 6. However, the value of the weight illustrated in FIG. 3 is not limited to that illustrated in FIG. 3, and may be set to various values.

Meanwhile, the data management module may store the data in the local cache when the score of the data, which is calculated by the score module, is greater than or equal to the reference value. In more detail, when the score of the data is greater than or equal to a first reference value, the data may be stored and managed in the local cache of the service server, when the score of the data is greater than or equal to a second reference value and is less than the first reference value, the data may be stored and managed in the cache server, and when the score of the data is less than the second reference value, the data may be stored and managed in the general data storage. In this case, the first reference value may be higher than the second reference value.

The method of calculating the score of the data based on the plurality of calculation criteria (e.g., the inquiry frequency for each time period, the size of the data, the distance between the data storage in which data is stored and the service server, and the group of the data) has been described with reference to FIGS. 2 and 3. Hereinafter, a detailed process of storing data in a local cache or a separate cache by the data management module will be described with reference to FIGS. 4 and 5.

Figure 4:
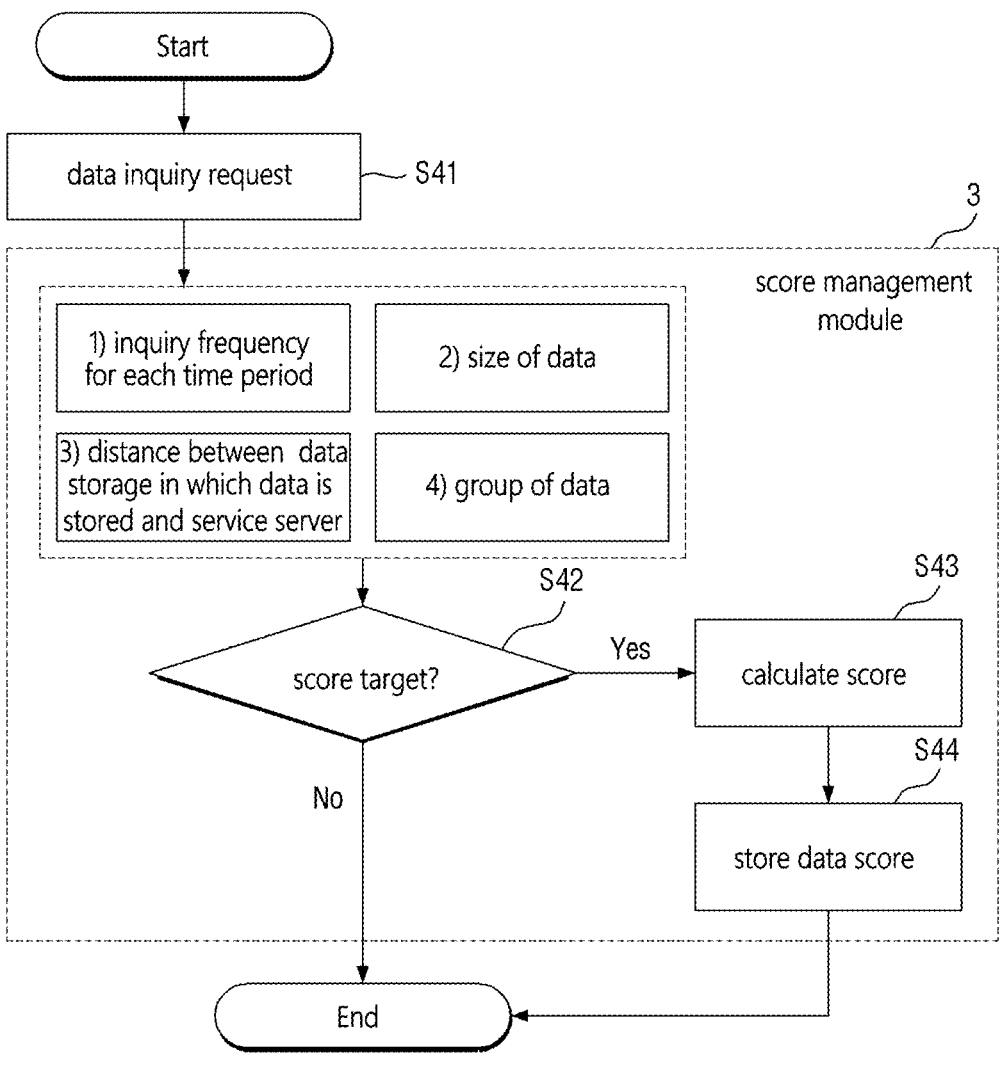
FIG. 4 is an exemplary view illustrating a process performed by a score management module according to one embodiment of the present disclosure.

FIG. 4 is an exemplary view illustrating a process performed by a score management module according to one embodiment of the present disclosure.

As illustrated in FIG. 4, in step S41, the score management module 3 may receive an inquiry request signal for specific data from the client terminal. In step S42, the score management module 3 may determine whether the specific data is a score calculation target. In this case, it may be understood that a process of determining whether the specific data is a score calculation target data is the same as the process of determining whether the specific data is cache target data. Since the process has been described with reference to FIG. 3, its repeated description will be omitted.

In step S42, when the specific data is not determined as a score calculation target, the score calculation process for the specific data may not be performed. This is because that it is not necessary to calculate the score for the specific data and store and manage the specific data in the local cache or the cache server of the service server based on the result of the calculation.

When it is determined in step S42 that the specific data is the score calculation target, the score management module 3 may calculate the score of the data in step S43. Afterwards, the score of the data, which is calculated through step S43, may be stored in the data score storage through step S44.

In the step S43 of calculating the score of the data and the step S42 of determining whether the data is a cache data target (i.e. score target), the inquiry frequency of the data for each time period, the size of the data, the distance between the data storage in which data is stored and the service server and the group information of the data may be used. Since the detailed description related to this has been given with reference to FIGS. 2 and 3, its repeated description will be omitted.

Figure 5:
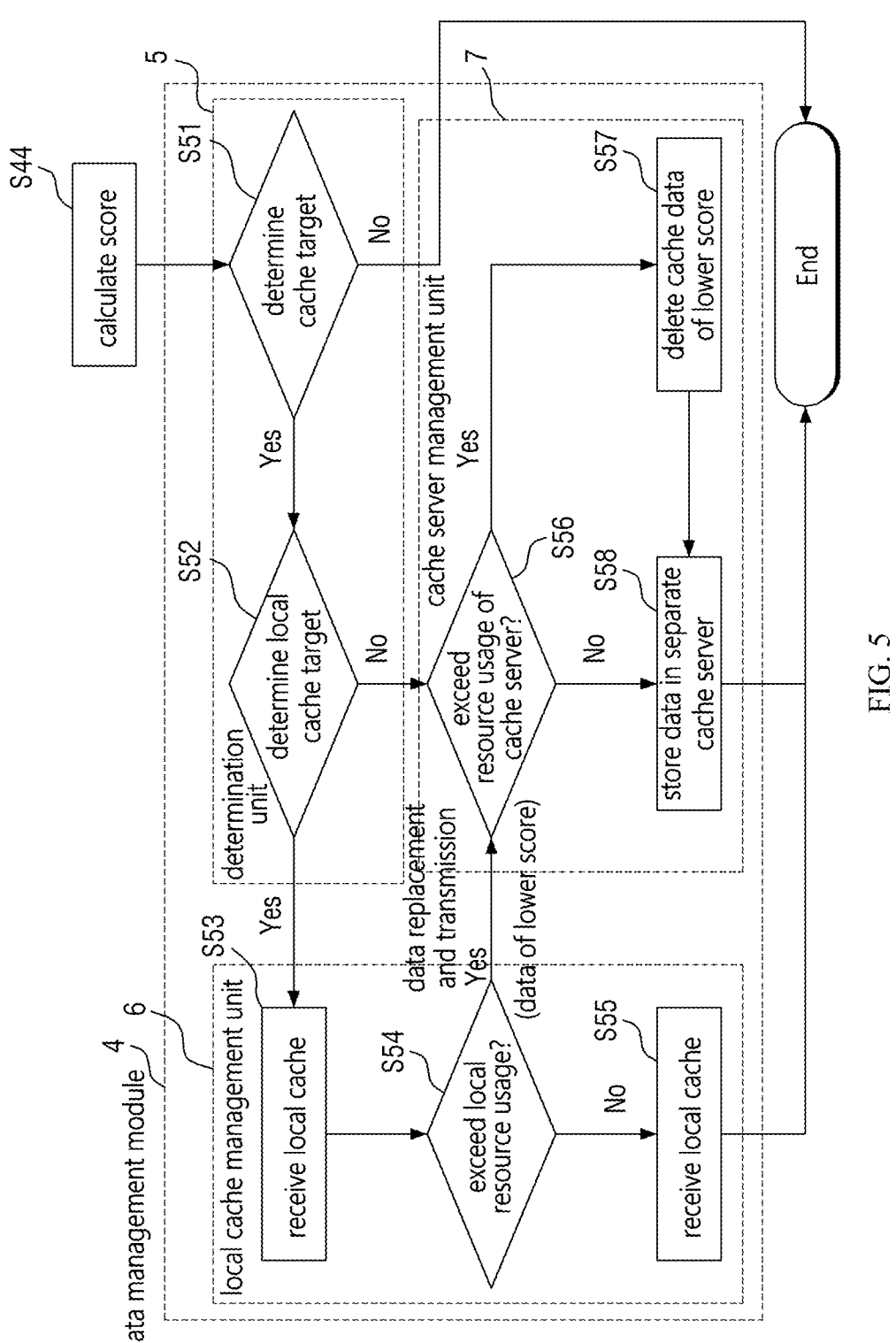
FIG. 5 is an exemplary view illustrating a process performed by a data management module according to one embodiment of the present disclosure.

FIG. 5 is an exemplary view illustrating a process performed by a data management module according to one embodiment of the present disclosure.

As illustrated in FIG. 5, the data management module 4 may include a determination unit 5 for determining whether the data is a storage target of the local cache of the service server, based on the score of the data, a local cache management unit 6 for replacing specific data previously stored in the local cache with other data, and a cache server management unit 7 for replacing specific data previously stored in the cache server with other data when the resource usage of the cache server is greater than or equal to the reference value.

The data management module 4 may receive the score for the specific data, which is calculated through step S44, from the score management module 3. In step S51, the score management module 3 may determine whether the specific data is cache target data. The operation of the step S51 may be understood to be the same as or similar to the process of determining whether the specific data is a score calculation target, which is performed by the score management module 3 and described with reference to FIG. 4, and the specific data that is not determined as cache target data may be stored in the general data storage.

In step S52, the determination unit 5 may determine whether the data is the local cache target data, based on the score of the data. Afterwards, when the data is determined as the local cache target data, the determination unit 5 may transmit the data to the local cache management unit 6, and when the data is not determined as the local cache target data, the determination unit 5 may transmit the data to the cache server management unit 7.

First, when the data is determined as local cache target data (i.e. when the data is determined to be stored and managed in the local cache of the service server due to a high score), the process performed by the local cache management unit 6 will be described.

In step S53, the local cache management unit 6 may receive the data determined as the local cache target data from the determination unit 5, and in step S54, it may be determined whether the resource usage of the local cache exceeds a reference value. Since the resource of the local cache is finite, when the resource usage of the local cache exceeds the reference value, some of the previously stored data needs to be deleted. Therefore, when it is determined that the resource usage of the local cache does not exceed the reference value, the data may be stored in the local cache through step S55. Also, when it is determined that the resource usage of the local cache exceeds the reference value, a process of deleting specific data previously stored in the local cache and storing the data may be performed. In this case, the score of the previously stored specific data may be lower than the score of the data. That is, the data (i.e., data A) of the lower score among the data previously stored in the local cache may be replaced with new data. Also, the data (i.e., data A) of the lower score, which is stored in the local cache, may be transmitted to the cache server.

The cache server management unit 7 may store the data (i.e., data A) of the lower score, which is transmitted from the local cache management unit 6, or replace the first data previously stored in the cache server with the data (i.e., data A) of the lower score, in consideration of the resource usage of the cache server.

In step S56, the cache server management unit 7 may determine whether the resource usage of the cache server exceeds the reference value, and when it is determined that the resource usage of the cache server does not exceed the reference value, the data (i.e., data A) of the lower score may be stored in the cache server through step S58. Also, when it is determined that the resource usage of the cache server exceeds the reference value, a process of deleting the first data previously stored in the cache server and storing the data (i.e., data A) of the lower score in the cache server may be performed through steps S57 and S58. In this case, the score of the previously stored first data may be lower than the data (i.e., data A) of the lower score.

Meanwhile, when the data is not determined as the local cache target data in the determination unit 5 through step S52 (i.e., when the data is not determined as the data to be stored and managed in the local cache of the service server because the score of the data is not high), the data may be transmitted to the cache server management unit 7, and may be directly stored in the cache server or may be stored after the data previously stored in the cache server is deleted, based on whether the resource usage of the cache server exceeds the reference value. Since the process of storing data based on the resource usage of the cache server has been described above, its repeated description will be omitted.

In summary, in the process of storing data in the local cache of the service server or the cache server based on the score calculated by the score management module, the memory and resource state of the server may be considered.

Therefore, the data may be stored and managed based on the resource usage of the local cache of the service server or the resource usage of the cache server, so that limited memory resources may be effectively utilized.

Meanwhile, there may be a plurality of service servers, and when the plurality of service servers exist in the same physical location, local caches of the respective service servers may be integrated to configure a local cache. Hereinafter, a case that the system for managing a cache based on a score according to one embodiment of the present disclosure is applied in an environment in which a plurality of service servers are disposed in the same location and local caches of the plurality of service servers are integrated and managed as one local cache will be described.

Figure 6:
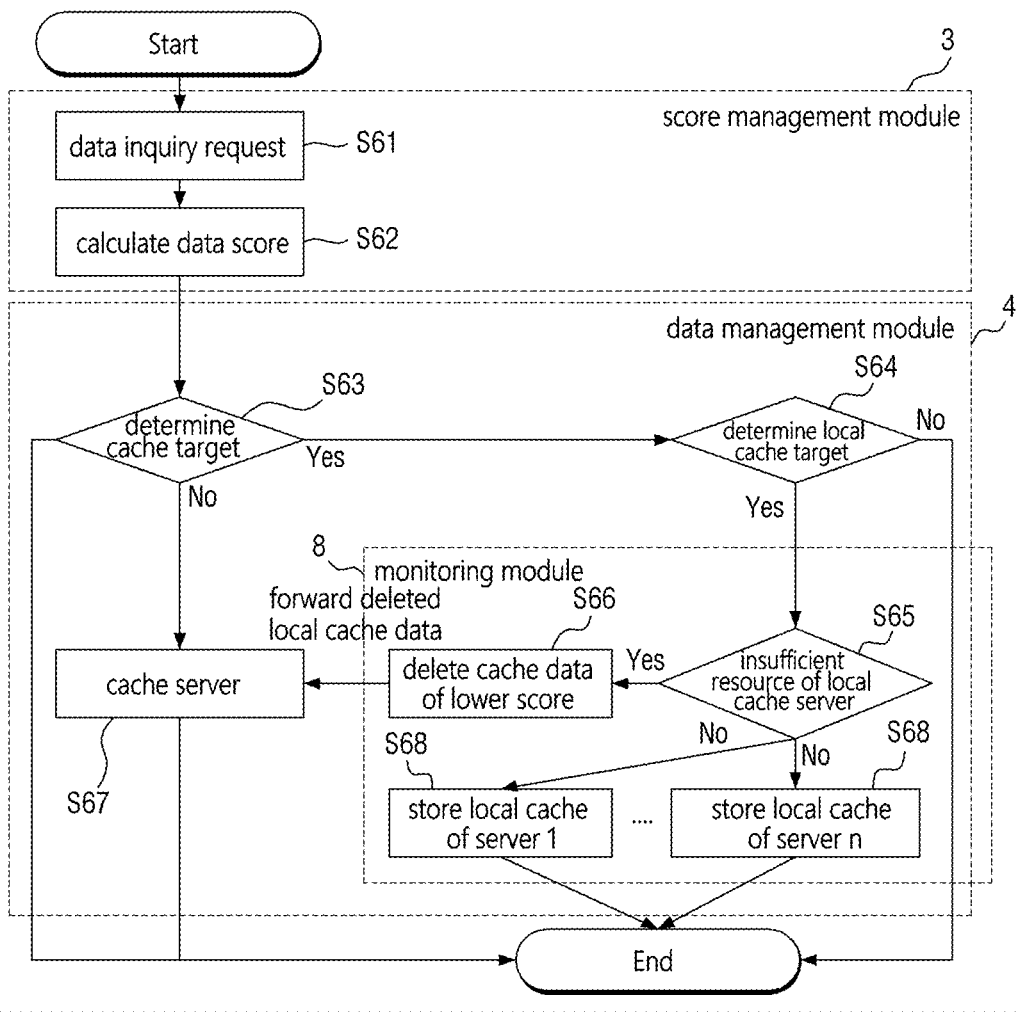
FIG. 6 is an exemplary view illustrating a process of storing cache data on a system comprised of local caches of a plurality of service servers according to one embodiment of the present disclosure.

FIG. 6 is an exemplary view illustrating a process of storing cache data on a system comprised of local caches of a plurality of service servers according to one embodiment of the present disclosure.

As illustrated in FIG. 6, the score management module 3 may receive the data inquiry request received from the client terminal in step S61. In addition, the score of the data may be calculated using a plurality of data calculation reference elements described with reference to FIG. 3 in step S62.

In step S63, the data management module 4 may determine whether the data is cache target data. When the data is determined as cache target data, in step S64, it may be determined whether the data is local cache target data, and when the data is not determined as cache target data, in step S68, the data may be stored in the cache server.

When the data is determined as the local cache target data through step S64, in step S65, it may be determined whether the resource usage of the local cache of each of the plurality of service servers exceeds a reference value. In this case, step S65 may be performed by the data management module 4 or may be performed by a separate monitoring module 8. That is, the monitoring module 8 may perform an operation of monitoring the resource usage of the local cache of each of the plurality of service servers.

In step S65, as a result of monitoring the resource usage of each local cache of a plurality of service servers (e.g., server 1, server 2, . . . , server n), it may be determined that the resource usage of one or more local caches exceeds the reference value. In this case, in step S66, the second data previously stored in the local cache of the first service server, of which resource usage exceeds the reference value, may be deleted, and in step S67, the data may be forwarded to the cache server and stored in the cache server. In this case, the score of the second data may be lower than the score of the data.

Meanwhile, as a result of monitoring the plurality of service servers, in step S68, the data may be stored in the local cache of which resource usage does not exceed the reference value. In this case, when the data is stored in the plurality of local caches, the same data may be stored in the plurality of local caches, or different data may be stored in the plurality of local caches, respectively.

First, the case that the same cache data is stored in the local caches of the plurality of service servers will be described. As a result of monitoring the resource usage of the plurality of local caches, when there is the first local cache having insufficient resources as its resource usage exceeds the reference value, some of the data previously stored in the first local cache may be deleted so that the local cache may make sure of sufficient resources. Afterwards, the same data may be stored in the plurality of local caches. Also, the same data may be stored in the remaining local caches except for the first local cache having insufficient resources.

Therefore, when a problem occurs in a local cache of a specific server as the same data is stored in the local caches of the plurality of servers, data stored in the local cache of another normal server may be stably imported in response to the user's data inquiry request, whereby the possibility of cache hit may be effectively improved.

Next, the case that different cache data are stored in the local caches of the plurality of service servers will be described. As a result of monitoring the resource usage of the plurality of local caches, when there is the first local cache having insufficient resources as its resource usage exceeds the reference value, some of the data previously stored in the first local cache may be deleted so that the local cache may make sure of sufficient resources. Afterwards, different data may be stored in the plurality of local caches. Also, different data may be stored in the remaining local caches except for the first local cache having insufficient resources.

Therefore, data different for each local cache of the plurality of servers may be stored, so that it is possible to overcome the limitation of storing finite data in the local cache of the server, which has limited resources, and make sure of more data stored in the cache memory and effectively improve cache capability.

Figure 7:
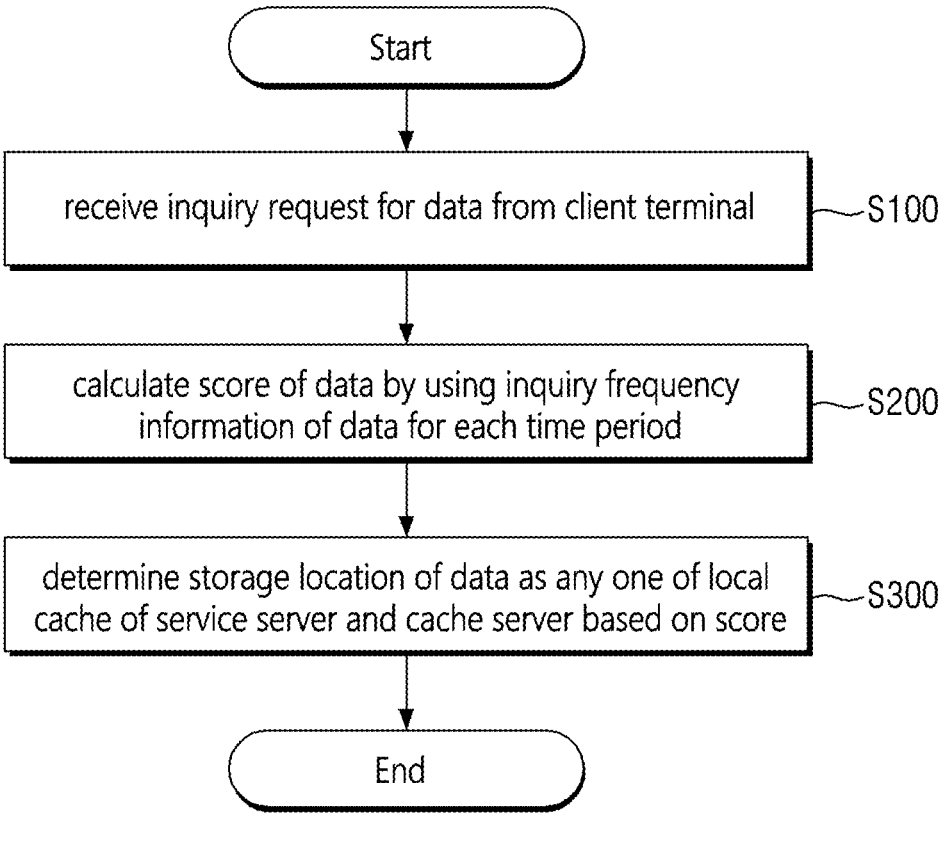
FIG. 7 is a flow chart illustrating a method for managing cache data based on a score according to another embodiment of the present disclosure.

FIG. 7 is a flow chart illustrating a method for managing cache data based on a score according to another embodiment of the present disclosure. However, this is only a preferred embodiment for achieving the object of the present disclosure, and some steps may be added or deleted as necessary. For reference, FIG. 7 illustrates steps/operations of a method for managing cache data based on a score, which are performed by the data management server 2 shown in FIG. 1. Therefore, in the following descriptions, when a subject of a specific step/operation is omitted, it may be understood that the specific step/operation is performed by the data management server 2.

As illustrated in FIG. 7, the method for managing cache data based on a score according to one embodiment of the present disclosure may be initiated in step S100 of receiving an inquiry request for data from the client terminal. In this case, the data may be stored in the local cache of the service server, the cache server and the general data storage.

In step S200, the data management server 2 may calculate the score of the data by using the inquiry frequency of the data for each time period. In more detail, the step S200 may be a process performed by the score management module included in the data management server 2. In addition, the score of the data may be calculated based on the size of the data, the distance between the data storage in which the data is stored and the server and the group information to which the data belongs, as well as the inquiry frequency of the data for each time period. Since the detailed description related to this has been given with reference to FIGS. 2 to 4, its repeated description will be omitted.

In step S300, the data management server 2 may determine the storage location of the data as one of the local cache of the service server and the cache server based on the score calculated through step S200. In more detail, the step S300 may be a process performed by the data management module included in the data management server 2. Afterwards, the data management module may replace the data previously stored in each of the local cache of the service server and the cache server with the data in consideration of the resource usage of each of the local cache of the service server and the cache server. Since the detailed description related to this has been given with reference to FIG. 5, its repeated description will be omitted.

The method and system for managing cache data based on a score according to some embodiments of the present disclosure have been described as above with reference to FIGS. 2 to 7. According to the method and system for managing cache data based on a score according to some embodiments of the present disclosure, data may be stored and managed based on the score calculated based on a timeline for inquiry data, so that a cache hit for data having a high inquiry frequency may be stably performed, the probability of a bottleneck in data inquiry may be reduced, and less data switching of a cache priority compared with a conventional method based on a least recently used (LRU) algorithm may occur, whereby system load may be efficiently managed. In addition, the score may be calculated using the weight given to each of the inquiry frequency of the data for each time period and the size of the data (e.g., a key value size of the data) without being calculated based on only the inquiry frequency information of the data, and the priority of the data may be determined based on the calculated score to store and manage the data in the local cache or the cache server, whereby the local cache, which is a finite memory resource, may be utilized more efficiently, and system performance may be improved.

In addition, according to the method and system for managing cache data based on a score according to some embodiments of the present disclosure, the local cache of the service server and the cache server may be used together, so that network costs consumed to import data from the cache server may be saved as compared with the case that the data is managed by constructing only a separate cache server, and a safety problem of overload that may be caused by excessive inquiry may be solved.

Hereinafter, in the system to which the details described with reference to FIGS. 2 to 7 are applied, the process of inquiring data by the client terminal will be described with reference to FIGS. 8 to 10.

Figure 8:
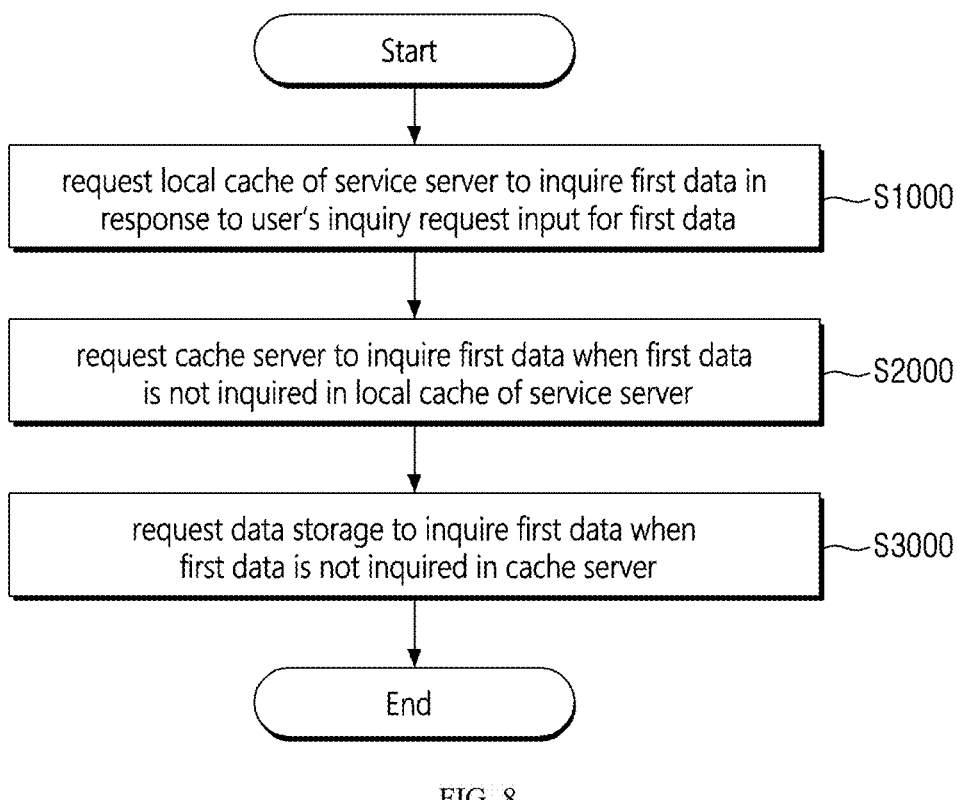
FIG. 8 is a flow chart illustrating a method for managing cache data based on a score according to another embodiment of the present disclosure.

FIG. 8 is a flow chart illustrating a method for managing cache data based on a score according to another embodiment of the present disclosure. However, this is only a preferred embodiment for achieving the object of the present disclosure, and some steps may be added or deleted as necessary. For reference, FIG. 8 illustrates steps/operations of a method for inquiring data in the system for managing cache data based on a score, which are performed by the client terminal 1 shown in FIG. 1. Therefore, in the following descriptions, when a subject of a specific step/operation is omitted, it may be understood that the specific step/operation is performed by the client terminal 1.

As illustrated in FIG. 8, in step S1000, in response to the user's request for inquiring first data, the client terminal may request the local cache of the service server to inquire the first data. When the first data is inquired in the local cache of the service server, the first data may be imported from the local cache of the service server. When the first data is not inquired in the local cache of the service server, in step S200, the client terminal may request the cache server to inquire the first data. Afterwards, when the first data is inquired in the cache server, the first data may be imported from the cache server, and when the first data is not inquired in the cache server, the client terminal may request the general data storage to inquire the first data.

Therefore, in response to the user's request to inquire the specific data, data inquiry may be performed in the order of storages having the closest physical distance to the service server, so that the inquiry speed of the data may be improved.

Figure 9:
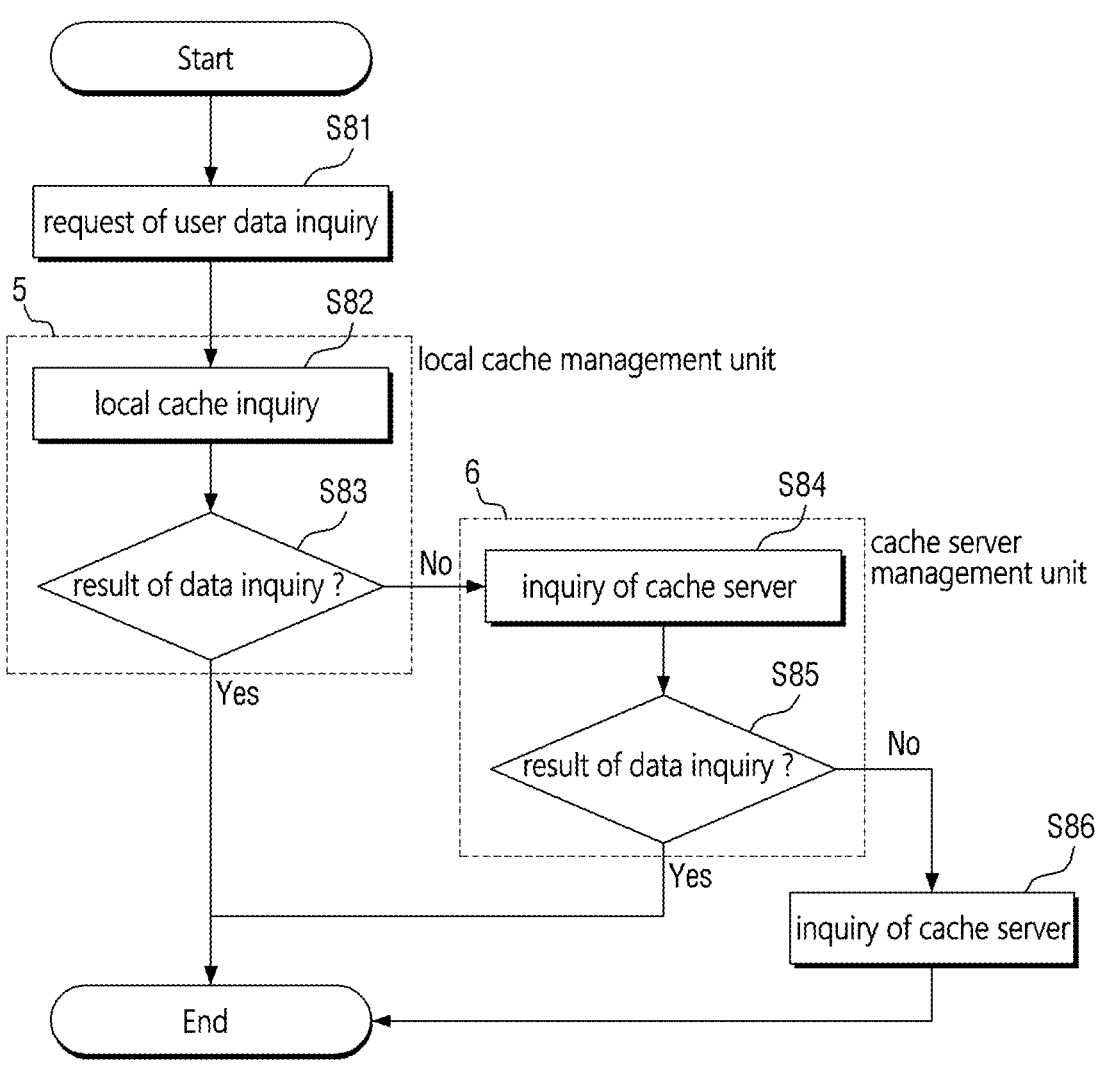
FIG. 9 is an exemplary view illustrating an operation shown in FIG. 8.

FIG. 9 is an exemplary view illustrating the operation shown in FIG. 8.

As illustrated in FIG. 9, in step S81, the client terminal may transmit an inquiry request signal for specific data to the data management server. In step S82, in response to the inquiry request of the client terminal, the local cache management unit 5 may request the local cache to inquire the data, receive an inquiry result for the data from the local cache in step S63 and import the data from the local cache when the data is inquired from the local cache. When the data is not inquired in the local cache, a procedure of inquiring the data in the cache server may be performed.

In step S84, the cache server management unit 6 may request the cache server to inquire the data, and may receive an inquiry result for the data from the cache server in step S85. When the data is inquired from the cache server, the cache server management unit 6 may import the data from the cache server. When the data is not inquired in the cache server, a procedure of inquiring the data in the general data storage may be performed through step S86.

Meanwhile, as described with reference to FIG. 6, there may be a plurality of service servers and the same data or different data may be stored in the plurality of local caches of the plurality of service servers. Hereinafter, when the plurality of service servers are constructed in the same location, a process of inquiring specific data in the client terminal and an exemplary environment in which the process is performed will be described with reference to FIG. 10.

Figure 10:
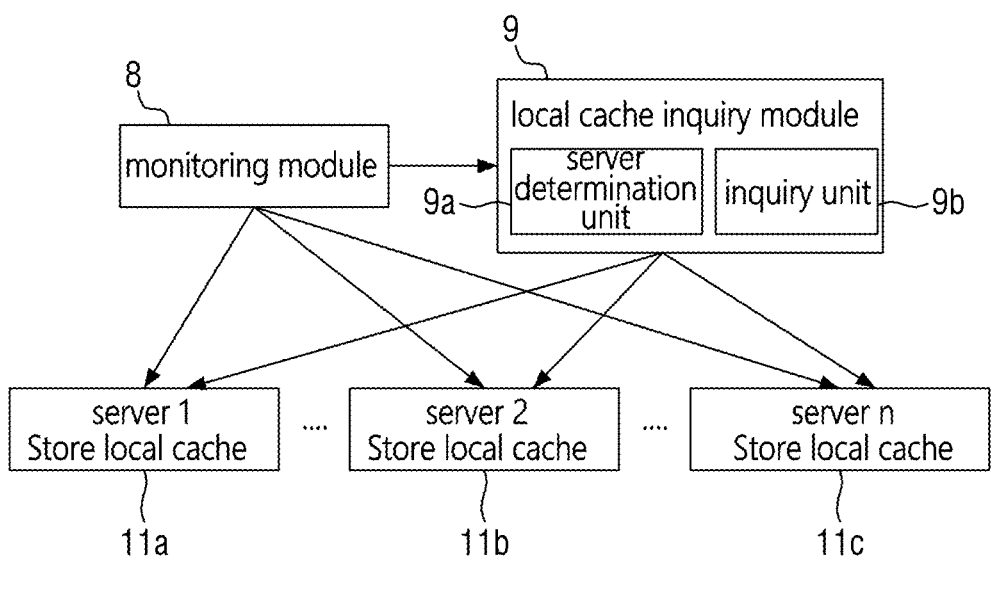
FIG. 10 illustrates an exemplary environment to which some operations shown in FIG. 8 may be applied.

FIG. 10 illustrates an exemplary environment to which some operations shown in FIG. 8 may be applied.

As illustrated in FIG. 10, the monitoring module 8 may monitor the resource state of the local caches 11*a*, 11*b* and 11*c* of the plurality of service servers in real time. In addition, the local cache inquiry module 9 may include a server determination unit 9*a* and an inquiry unit 9*b*. In this case, the server determination unit 9*a* may receive the result of monitoring the resource usage for the local caches of the plurality of servers from the monitoring module 8, and may determine whether resources available in a local cache of a specific server are insufficient, based on the received monitoring result. In addition, the inquiry unit 9*b* may inquire the data requested by the user in the local cache of the specific service server based on the result of the determination by the server determination unit 9*a*.

First, the case that the same data is stored in the local caches of the plurality of service servers will be described. The monitoring module 8 may monitor the local cache state of each of the service servers in real time, and may share information on the resource state with each service server. In this case, when there is a problem in the local cache state of the specific service server at the time of the user's data inquiry request (e.g., when the resource usage exceeds the reference value), the monitoring module 8 may request the local cache of the service server (e.g., the resource usage is less than the reference value) having no problem to inquire the data. Also, the monitoring module 8 may appropriately distribute and transmit data inquiry request signals for each local cache of the plurality of service servers so that network traffic is not concentrated.

Therefore, the plurality of service servers may share the resource state of each local cache with the monitoring module in real time and appropriately perform an inquiry process for the data based on the resource state (e.g., resource usage), thereby effectively improving data inquiry performance and stability.

Next, the case that different data are stored in the local caches of the plurality of service servers will be described. The monitoring module 8 may monitor the local cache state (i.e. resource state) of each of the service servers and a list of data stored in the respective local caches in real time, share information on the resource state with each service server and update information on the change in real time when the change occurs in the list of data.

Therefore, the plurality of service servers may share the resource state of each local cache and the list of data with the monitoring module in real time and determine which local cache may quickly inquire data based on the resource state (e.g. resource usage) and the list of data, thereby effectively improving the data inquiry speed.

Figure 11:
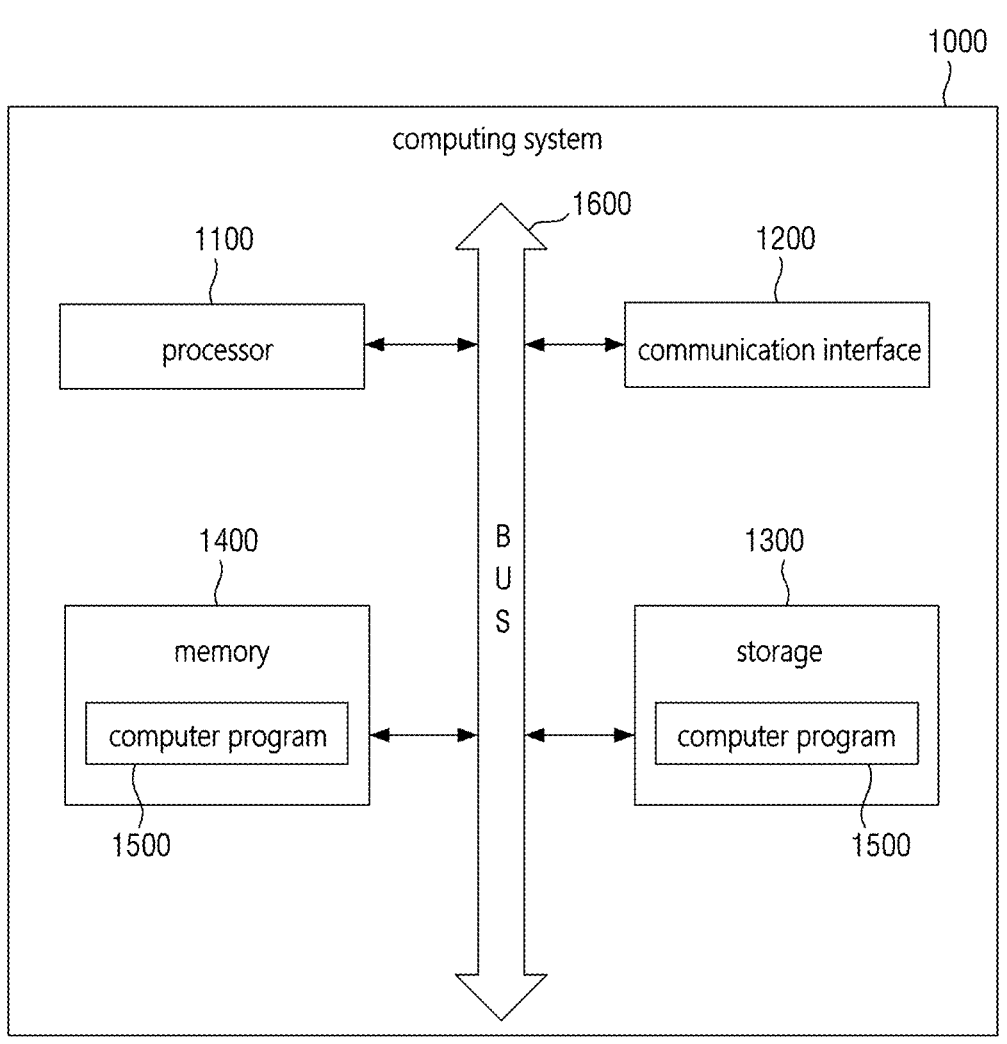
FIG. 11 is a hardware schematic view illustrating a system for managing cache data based on a score according to some embodiments of the present disclosure.

FIG. 11 is a hardware schematic view illustrating a system for managing cache data based on a score according to some embodiments of the present disclosure. The system 1000 for managing cache data based on a score, which is shown in FIG. 11, may include one or more processors 1100, a system bus 1600, a communication interface 1200, a memory 1400 for loading a computer program 1500 performed by the processor 1100, and a storage 1300 for storing the computer program 1500.

The processor 1100 controls the overall operation of each component of the system 1000 for managing cache data based on a score. The processor 1100 may perform computation for at least one application or program for executing methods/operations according to various embodiments of the present disclosure. The memory 1400 stores various types of data, commands and/or information. The memory 1400 may load one or more computer programs 1500 from the storage 1300 to execute the methods/operations according to various embodiments of the present disclosure. The system bus 1600 provides a communication function between components of the system 1000 for managing cache data based on a score. The communication interface 1200 supports Internet communication of the system 1000 for managing cache data based on a score. The storage 1300 may non-temporarily store one or more computer programs 1500. The computer program 1500 may include one or more instructions in which the methods/operations according to various embodiments of the present disclosure are implemented. When the computer program 1500 is loaded into the memory 1400, the processor 1100 may perform the methods/operations according to various embodiments of the present disclosure by executing the one or more instructions.

In some embodiments, the system 1000 for managing cache data based on a score, which is described with reference to FIG. 11, may be configured using one or more physical servers included in a server farm based on cloud technology such as a virtual machine. In this case, at least some of the processor 1100, the memory 1400 and the storage 1300 among the components shown in FIG. 11 may be virtual hardware, and the communication interface 1200 may be also configured with a virtualized networking element such as a virtual switch.

Embodiments of the present disclosure have been described above with reference to FIGS. 1 through 11, but it should be noted that the effects of the present disclosure are not limited to those described above, and other effects of the present disclosure should be apparent from the following description.

The technical features of the present disclosure described so far may be embodied as computer readable codes on a computer readable medium. The computer program recorded on the computer readable medium may be transmitted to other computing device via a network such as internet and installed in the other computing device, thereby being used in the other computing device.

Although operations are shown in a specific order in the drawings, it should not be understood that desired results may be obtained when the operations must be performed in the specific order or sequential order or when all of the operations must be performed. In certain situations, multitasking and parallel processing may be advantageous. In concluding the detailed description, those skilled in the art will appreciate that many variations and modifications may be made to the example embodiments without substantially departing from the principles of the present disclosure. Therefore, the disclosed example embodiments of the disclosure are used in a generic and descriptive sense only and not for purposes of limitation.

The protection scope of the present invention should be interpreted by the following claims, and all technical ideas within the equivalent range should be interpreted as being included in the scope of the technical ideas defined by the present disclosure.

What is claimed is:

1. A system for managing cache data based on a score, the system comprising at least one processor that implements:
    a score management module configured to receive an inquiry request for data from a client terminal and obtain a score of the data by using inquiry frequency information of the data for each time period; and
    a data management module configured to store the data in a local cache of a service server or a cache server based on the score,
    wherein the inquiry frequency information comprises information obtained by summing inquiry frequencies of the data for each time period, the inquiry frequencies being obtained for a first period based on a time when the inquiry request is received, and
    wherein the first period has a value that increases based on a sum of differences in inquiry frequencies of the data for each time period having a value less than a reference value.

2. The system of claim 1, wherein the score management module is configured to obtain the score of the data by further considering a size of the data.

3. The system of claim 2, wherein the score of the data corresponds to a value obtained by dividing a value of the inquiry frequency information of the data for each time period by the size of the data.

4. The system of claim 2, wherein the score management module is configured to obtain the score of the data by further considering a distance between a data storage in which the data is stored and the service server, and
    wherein the data storage is a location where the data is stored before a time of receiving the inquiry request.

5. The system of claim 4, wherein the score management module is configured to obtain the score, based on the inquiry frequency information of the data for each time period and the size of the data, and adjust the obtained score in accordance with the distance between the data storage and the service server.

6. The system of claim 4, wherein the score management module is configured to obtain the score of the data by further considering group information of the data.

7. The system of claim 6, wherein the score of the data is obtained by giving a high weight to the group information of the data based on the data belonging to a first group, and
    wherein the first group is a set of data of which estimated frequency of the inquiry request for data is greater than or equal to a reference value.

8. The system of claim 6, wherein the data management module is configured to store the data in the local cache of the service server based on the score of the data being greater than or equal to a reference value.

9. The system of claim 1, wherein the data management module includes:
    a determination unit configured to determine whether the data is to be stored in the local cache of the service server, based on the score of the data; and
    a local cache management unit configured to replace specific data previously stored in the local cache with the data, based on the data being determined to be stored in the local cache and a resource usage of the local cache being greater than or equal to a first reference value, and
    wherein the specific data has a score lower than the score of the data.

10. The system of claim 9, wherein the data management module further includes a cache server management unit, and the local cache management unit is configured to transmit the specific data to the cache server management unit,
    wherein the cache server management unit is configured to replace first data previously stored in the cache server with the specific data based on a resource usage of the cache server being greater than or equal to a second reference value, and
    wherein the first data has a score lower than the score of the specific data.

11. The system of claim 9, wherein the data management module further includes a cache server management unit, and the determination unit is configured to transmit the data to the cache server management unit based on the data being determined not to be stored in the local cache,
    wherein the cache server management unit is configured to replace first data previously stored in the cache server with the data based on the resource usage of the cache server being greater than or equal to a third reference value, and
    wherein the first data has a score lower than the score of the data.

12. The system of claim 1, wherein the service server comprises a plurality of service servers, and
    wherein the data management module is configured to store the data in the local cache of each of the plurality of service servers.

13. The system of claim 12, wherein the at least one processor further implements a monitoring module configured to monitor a resource usage of the local cache of each of the plurality of service servers,
    wherein the data management module is configured to replace data previously stored in a local cache of a first service server, which has a resource usage of a reference value or more, with the data based on a monitoring result received from the monitoring module, and wherein the previously stored data has a score lower than the score of the data.

14. The system of claim 12, wherein the at least one processor further implements a monitoring module configured to monitor a resource usage of the local cache of each of the plurality of service servers, and wherein the data management module is configured to store the data in a local cache of a first service server, which has a resource usage of a reference value or less, based on a monitoring result received from the monitoring module.

15. A method for managing cache data based on a score, performed by using at least one processor, the method comprising:

receiving an inquiry request for data from a client terminal;

obtaining a score of the data by using inquiry frequency information of the data for each time period; and determining a storage location of the data as any one of a local cache of a service server and a cache server based on the score, wherein the inquiry frequency information comprises information obtained by summing inquiry frequencies of the data for each time period, the inquiry frequencies being obtained for a first period based on a time when the inquiry request is received, and wherein the first period has a value that increases based on a sum of differences in inquiry frequencies of the data for each time period having a value less than a reference value.

16. The method of claim 15, wherein the obtaining the score of the data includes obtaining the score of the data by further considering at least one of a size of the data, a distance between a data storage in which the data is stored and the service server, or group information of the data, and wherein the data storage is a location where the data is stored before a time of receiving the inquiry request.

17. A method for managing cache data based on a score, performed by using at least one processor, the method comprising:

requesting a local cache of a service server to inquire first data, in response to receiving an inquiry request for the first data from a user;

requesting a cache server to inquire the first data, based on the first data being not inquired in the local cache of the service server; and requesting a data storage to inquire the first data based on the first data being not inquired in the cache server, wherein the first data is stored in one of the local cache, the cache server and the data storage based on inquiry frequency information, wherein the inquiry frequency information comprises information obtained by summing inquiry frequencies of the data for each time period, the inquiry frequencies being obtained for a first period based on a time when the inquiry request is received, and wherein the first period has a value that increases based on a sum of differences in inquiry frequencies of the data for each time period having a value less than a reference value.

* * * * *